(12) United States Patent
Allen et al.

(10) Patent No.: US 9,464,757 B2
(45) Date of Patent: Oct. 11, 2016

(54) FLUID DRAIN

(71) Applicants: David Mark Allen, St. Louis, MO (US); Canlong He, St. Louis, MO (US)

(72) Inventors: David Mark Allen, St. Louis, MO (US); Canlong He, St. Louis, MO (US)

(73) Assignee: AKTIEBOLAGET SKF, Gothenburg (DE)

( * ) Notice: Subject to any disclaimer, the term of this patent is extended or adjusted under 35 U.S.C. 154(b) by 216 days.

(21) Appl. No.: 14/069,035

(22) Filed: Oct. 31, 2013

(65) Prior Publication Data
US 2015/0114972 A1  Apr. 30, 2015

(51) Int. Cl.
*F16N 31/00* (2006.01)

(52) U.S. Cl.
CPC ................... *F16N 31/004* (2013.01)

(58) Field of Classification Search
CPC .................................................. F16N 31/004
USPC .............. 184/1.5; 24/20 R, 20 S; 141/86, 98
See application file for complete search history.

(56) References Cited

U.S. PATENT DOCUMENTS

| | | | | |
|---|---|---|---|---|
| 2,629,908 A * | 2/1953 | Keck | ............................. | 24/20 S |
| 2,685,719 A * | 8/1954 | Golden | ........................ | 24/20 S |
| 2,717,660 A * | 9/1955 | Reisert et al. | ................. | 184/1.5 |
| 4,235,264 A * | 11/1980 | Rau et al. | ......................... | 141/1 |
| 4,274,645 A * | 6/1981 | Ferguson et al. | .......... | 280/47.26 |
| 4,425,682 A * | 1/1984 | Hashimoto et al. | .......... | 24/20 S |
| 5,048,159 A * | 9/1991 | Johansson et al. | ........... | 24/20 R |
| 5,291,921 A * | 3/1994 | Devine | ........................... | 141/86 |
| 5,377,389 A * | 1/1995 | Calmettes et al. | ............ | 24/20 R |
| 5,921,262 A * | 7/1999 | Campbell | ......................... | 137/1 |
| D429,160 S | 8/2000 | Tally | | |
| 6,345,692 B1 * | 2/2002 | Wilson | .......................... | 184/1.5 |
| 6,367,586 B1 | 4/2002 | Tally | | |
| 6,719,017 B1 * | 4/2004 | McArthur et al. | .............. | 141/86 |
| 6,840,293 B1 * | 1/2005 | Smith | ............................. | 141/86 |
| 2003/0106608 A1 * | 6/2003 | Walter et al. | ................. | 141/331 |
| 2004/0256023 A1 * | 12/2004 | Camoli | .......................... | 141/86 |
| 2005/0006384 A1 * | 1/2005 | Iwamasa et al. | ............... | 220/9.4 |
| 2008/0296091 A1 * | 12/2008 | Avalos | ........................... | 184/1.5 |
| 2011/0042385 A1 * | 2/2011 | Treslo | ........................... | 220/571 |

* cited by examiner

*Primary Examiner* — Michael Riegelman
(74) *Attorney, Agent, or Firm* — MH2 Technology Law Group, LLP (57) ABSTRACT

A fluid drain may include a fluid reservoir comprising a lower tube inlet that opens into the fluid reservoir, a lower tube at least partially positioned within the lower tube inlet, and an upper tube at least partially positioned within the lower tube. The fluid drain may further include an upper tube clamp having an opening therein, wherein the upper tube is positioned within the opening in the upper tube clamp and the upper tube clamp is configured to remain attached to the upper tube upon removal of the upper tube from the lower tube.

14 Claims, 5 Drawing Sheets

FLUID DRAIN

BACKGROUND

Telescoping fluid drains are used during routine maintenance of engines and transmissions of vehicles such as automobiles, trucks, heavy equipment, etc. Once the vehicle is elevated with a lift, the fluid drain is placed under a drain plug or other structure of the vehicle and telescopically elevated into position so that a drain pan or funnel is close to the underside of the vehicle. Once the funnel is in position, a drain plug is removed from the vehicle or a stopcock is opened and the oil or other fluid drains from the vehicle into the funnel. The fluid may be collected within a drain fluid reservoir.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment, a fluid drain may include a fluid reservoir comprising a lower tube inlet that opens into the fluid reservoir, a lower tube at least partially positioned within the lower tube inlet, an upper tube at least partially positioned within the lower tube, and an upper tube clamp having an opening therein, wherein the upper tube is positioned within the opening in the upper tube clamp and the upper tube clamp is configured to remain attached to the upper tube upon removal of the upper tube from the lower tube.

In another embodiment, a fluid drain may include a fluid reservoir comprising a lower tube inlet that opens into the fluid reservoir, a lower tube at least partially positioned within the lower tube inlet and secured to the fluid reservoir by a lower tube clamp, an upper tube at least partially positioned within the lower tube, and an upper tube clamp having an opening therein, wherein the upper tube is positioned within the opening in the upper tube clamp and the upper tube clamp is configured to remain attached to the upper tube upon removal of the upper tube from the lower tube. The fluid drain may further include a recessed filter shelf on a top of the fluid reservoir, the recessed filter shelf comprising a sloped floor and an opening within the sloped floor, wherein the sloped floor angles downward toward the opening within the sloped floor, wherein the opening extends through an exterior of the fluid reservoir to an interior of the fluid reservoir. The fluid drain may further include a lower tube positioned within the lower tube inlet and secured to the fluid reservoir by a lower tube clamp, an upper tube partially positioned within the lower tube, and a tool pan adjustably connected to the lower tube. The tool pan may include an opening through a center of the tool pan, wherein the lower tube is positioned within the opening through the center of the tool pan, a plurality of arms that extend radially from the center of the tool pan, and an outer arcuate member connected to the plurality of arms, wherein the outer arcuate member terminates in a first end comprising a first hook and a second end comprising a second hook, at least one recessed shelf between two of the plurality of arms, and a grip defined by the outer arcuate member and an opening between two of the plurality of arms.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIG. 2A is a perspective depiction.

FIGS. 5A and 5B are perspective depictions.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts. It will be understood that the embodiments depicted in each of the figures are generalized schematic illustrations and that other components may added or existing components may be removed or modified.

Figure 1:
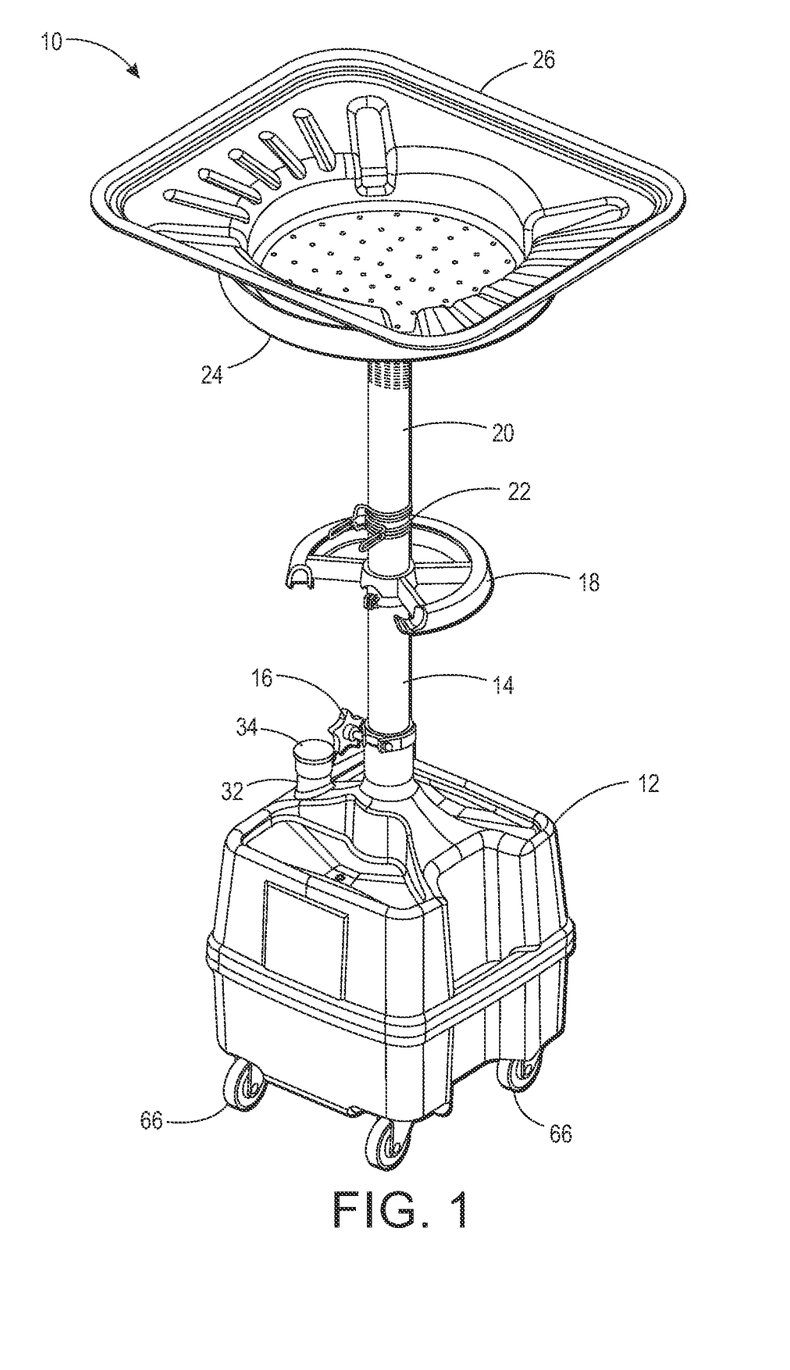
FIG. 1 is a perspective depiction of a fluid drain, according to an embodiment.

Embodiments of the present disclosure include a fluid drain having one or more structural elements or features that may simplify the service and maintenance of vehicles during the removal and replacement of vital fluids such as oil, transmission fluid, coolant, etc. FIG. 1 is a perspective depiction of a telescoping fluid drain 10 according to an embodiment. The fluid drain 10 may include a fluid reservoir 12 and a cylindrical, hollow lower tube 14 secured and connected to the fluid reservoir 12 by a lower tube clamp 16. The fluid drain 10 may also include a tool pan 18 that is adjustably connected to the lower tube 14 and a cylindrical, hollow upper tube 20 that is positioned and adjustably slides within the lower tube 14. The fluid drain 10 may further include an upper tube clamp 22 that may be used to adjust a height position of the upper tube 20 within the lower tube 14, a funnel 24 positioned at a top of the upper tube 20, and an optional removable dripping pan insert 26 that may rest within the funnel 24.

Figure 2A:
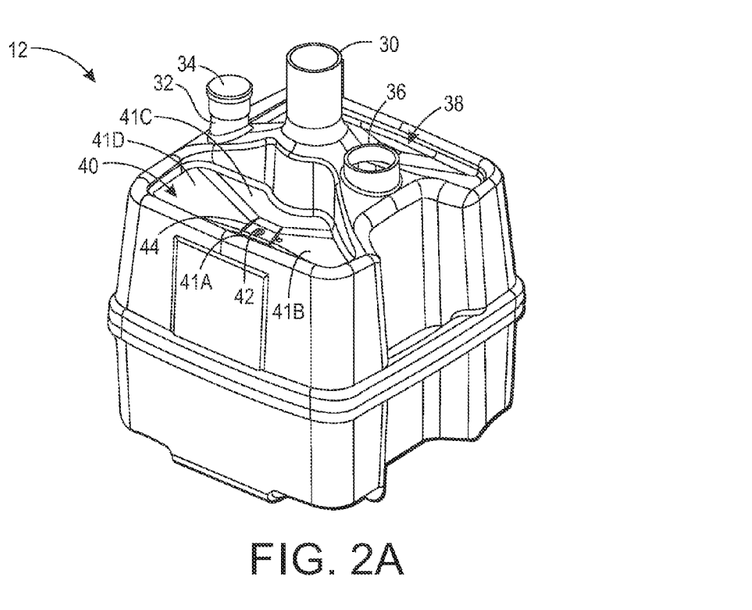
Figure 2B:
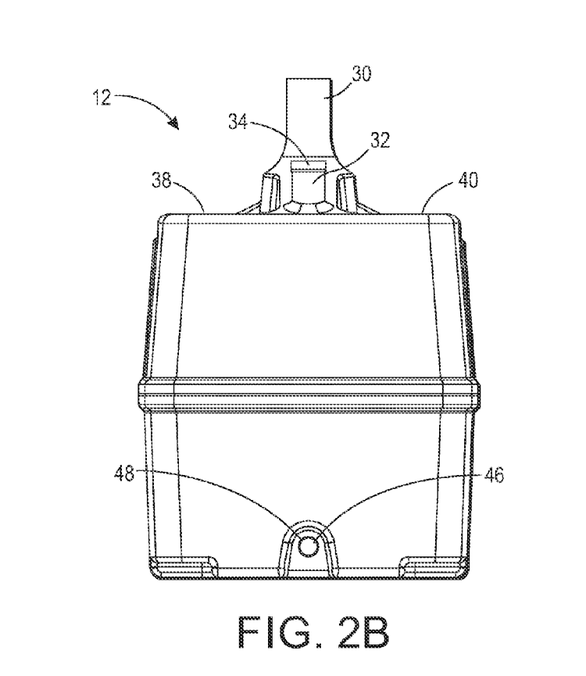
FIG. 2B is a side view, of a fluid reservoir for a fluid drain in accordance with an embodiment.

FIG. 2A is a perspective depiction, and FIG. 2B is a side view, of a fluid reservoir 12 in accordance with an embodiment. In this embodiment, the fluid reservoir 12 includes a lower tube inlet 30 that opens into the fluid reservoir 12, and has an inside diameter larger than an outside diameter of the lower tube 14 (FIG. 1). In an embodiment, the lower tube inlet 30 may have an inside diameter of between about 1.7 inches and about 1.8 inches, while an end of the lower tube 14 inserted into the lower tube inlet 30 has a outer diameter of between about 1.9 inches and about 2.1 inches. An end of the lower tube 14 is inserted into, and positioned within, the lower tube inlet 30 and secured to the fluid reservoir 12 using the lower tube clamp 16 (FIG. 1). Some fluid drain height adjustment may be made by inserting the lower tube 14 shallower or deeper into the fluid reservoir 12 through the lower tube inlet 30 before the lower tube 14 is clamped into position with the lower tube clamp 16, although some or most drain height adjustment may be made using the upper tube clamp 22, as discussed below.

The fluid reservoir 12 may further include a pour spout 32 for emptying fluid from the fluid reservoir 12. The pour spout 32 may include a cap 34 that threads or snap fits onto the pour spout 32. For smaller fluid reservoirs 12, for example eight-gallon fluid reservoirs, a fluid reservoir 12 that is full of fluid may be sufficiently light that the fluid reservoir may be lifted or tipped to empty fluid through the pour spout 32. Larger fluid reservoirs 12, for example, an 18-gallon fluid reservoir, as depicted in FIG. 2A, may include a pump port 36 to which a pump may be attached for removal of fluid from the fluid reservoir 12. Smaller fluid reservoirs 12, such as the embodiment of the fluid reservoir 12 depicted in FIG. 1, may not include a pump port 36. Although two specific sizes are indicated, it will be appreciated that fluid reservoirs 12 of various sizes, with or without the pump port 36, may be employed, consistent with the present disclosure.

The fluid reservoir 12 may further include one or more flat or sloped recesses or shelves at the top of the fluid reservoir 12 as depicted in FIG. 2A. In an embodiment, a flat tool shelf 38 having a flat (horizontal) floor provides a convenient location to store tools and/or a drain plug after removal from a vehicle.

The fluid reservoir 12 may also include a filter shelf 40 configured to drain fluid from a filter, for example oil from an oil filter, into the fluid reservoir 12. In an embodiment, the filter shelf 40 may include a floor having at least one angled panel. FIG. 2A depicts four angled panels 41A, 41B, 41C, and 41D that angle downward and taper toward a hole or opening 42 at the bottom center of the filter shelf 40. The hole 42 at the bottom of the filter shelf 40 extends through an exterior to an interior of the fluid reservoir 12. A removable plug or stopper 44 placed into the hole 42 prevents debris from entering the fluid reservoir 12 when the filter shelf 40 is not being used to drain fluid from a filter. To drain a filter (not depicted for simplicity), the plug 44 is unplugged from the hole 42 and a filter is removed from a vehicle and placed hole-side down on the filter shelf 40 such that oil or other fluid drains from the filter, through the hole 42, and into the fluid reservoir 12. In an embodiment, the panels 41A-41D may slope downward toward the hole 42 at an angle of between about 4° and about 20° away from horizontal. In an embodiment, the plug 44 may be designed so that it may be snapped into a storage hole (not individually depicted for simplicity) near the drain hole 42 on the reservoir to retain the plug 44.

FIG. 2B depicts a threaded drain port 46 through which fluid may be drained from the fluid reservoir 12. In an embodiment, the drain port 46 is plugged by a threaded cap 48 that may be removed to drain fluid while the fluid reservoir 12 remains in an upright position. In an embodiment, a spout or valve (not depicted for simplicity) may be screwed into the drain port 46 such that, when filled, the fluid reservoir may be emptied through the drain port 46 and the spout, for example into a floor drain.

Figure 3:
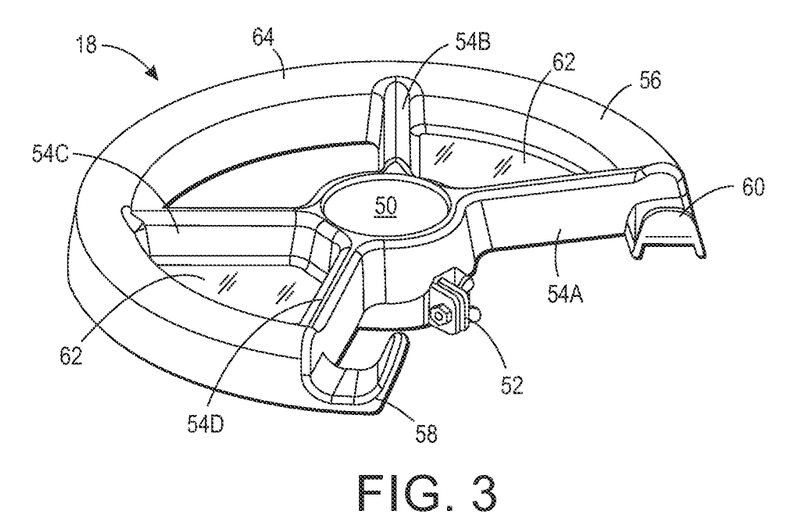
FIG. 3 is a perspective depiction of a tool pan for a fluid drain in accordance with an embodiment.

FIG. 3 is a perspective depiction of an embodiment of the tool pan 18. An upper end of the lower tube 14 may be inserted through an opening 50 at the center of the tool pan 18, then the tool pan 18 may be secured to the lower tube 14 using a clamp 52 that may be integral with, or otherwise attached to, the tool pan 18 as depicted. In an embodiment, the tool pan 18 may include a plurality of arms 54A, 54B, 54C, and 54D that extend radially from the center of the tool pan 18 and connect to an outer arcuate member 56. The outer arcuate member 56 may terminate in a first end having a first hook 58 and a second end having a second hook 60. The hooks 58, 60 may provide a location to hang wrenches or other tools, replacement parts, etc. In an embodiment, the outer arcuate member 56 may have a diameter of between about between about 10 inches and about 11 inches.

The tool pan 18 may further include one or more webbed, recessed tool pan shelves 62 between two or more of the arms 54A-D as depicted. The tool pan shelves 62 may be used to store a drain plug, new oil filter, etc. Each shelf may provide a storage area of between about 6 inch$^2$ and about 7.5 inch$^2$. A non-webbed region provides a tool pan grip 64, e.g., between arms 54B and 54C, to grip the tool pan outer arcuate member 56 during movement of the fluid drain 10, for example on rollers or castors 66 (FIG. 1).

Figure 4:
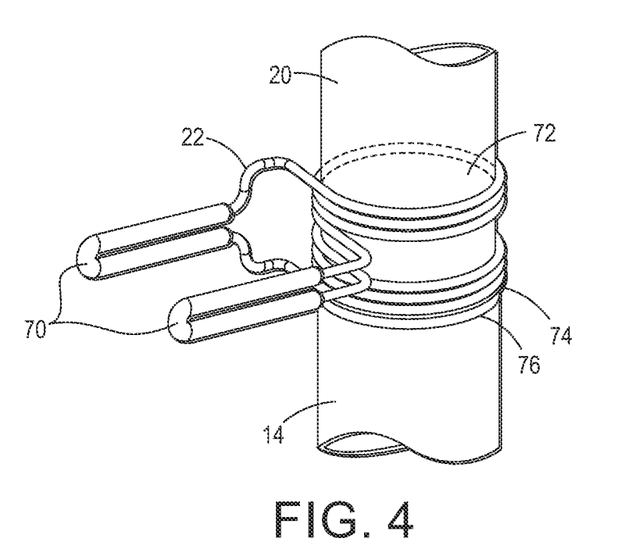
FIG. 4 is a perspective depiction of an upper tube clamp that may be used to adjust a height of a fluid drain in accordance with an embodiment.

FIG. 4 is a perspective depiction of the upper tube clamp 22 that may be attached to the upper tube 20 and used to adjust a height of the fluid drain 10, according to an embodiment. In this embodiment, the clamp 22 is a spring clip collar (i.e., spring clamp collar) having ends 70 that are pinched together to increase a diameter of an opening 72 through which the upper tube 20 is inserted, with a lower surface 74 of the spring clip collar 22 resting on an upper lip 76 of the lower tube 14. To change or set the height of the fluid drain 10, the ends 70 are pinched together to increase the diameter of the opening 72, the end of upper tube 20 is raised or lowered into a desired position relative to the lower tube 14, then the ends 70 of the clamp 22 are released to decrease the diameter of the opening 72 to secure the spring clip collar 22 to the upper tube 20. In addition to providing a simplified method for adjusting the height of the fluid drain 10 compared to some prior fluid drains, the upper tube clamp 22 may remain attached to the upper tube 20 when the upper tube 20 is removed from the lower tube 14, for example when pouring fluid from the fluid reservoir 12 through spout 32. When the upper tube 20 with the attached spring clip collar 22 is reinserted into the lower tube 14, the fluid drain 10 remains at the pre-removal height without requiring any height readjustment. In an embodiment, the opening 72 through upper tube clamp 22 may have a minimum diameter of between about 1.70 inches and about 1.85 inches when in a relaxed state and a maximum diameter of between about 1.88 inches and about 2.00 inches when pinched into a flexed state.

Use of a quick-release clamp as the upper tube clamp 22 may provide advantages similar to those of the spring clip collar. Both spring clip collars and quick-release clamps maintain a closed (i.e., endless) loop around the entirety of the circumference of the upper tube 20 during adjustment of the upper tube clamp 22. Further, during adjustment of both of these types of clamps, the diameter of an opening in the clamp changes from a first diameter in a closed position to a second diameter in an open position, with the second diameter being larger than the first diameter. Additionally, when in the closed position, both types of clamps remain self-attached to the upper tube 20 during removal of the upper tube 20 from the lower tube 14 such that, when the upper tube 20 is reinserted into the lower tube 14, the height of the fluid drain 10 is maintained without readjustment of the position of the upper tube clamp 22. Thus, spring clip collars and quick release clamps, as well as other clamps that have each of these properties, are referred to herein collectively as "adjustable closed-loop clamps."

Figure 5A:
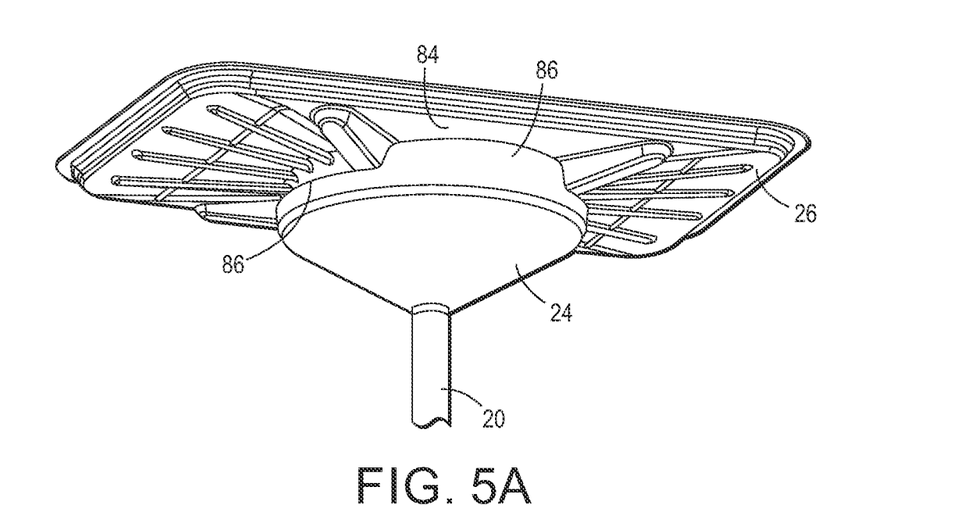
Figure 5B:
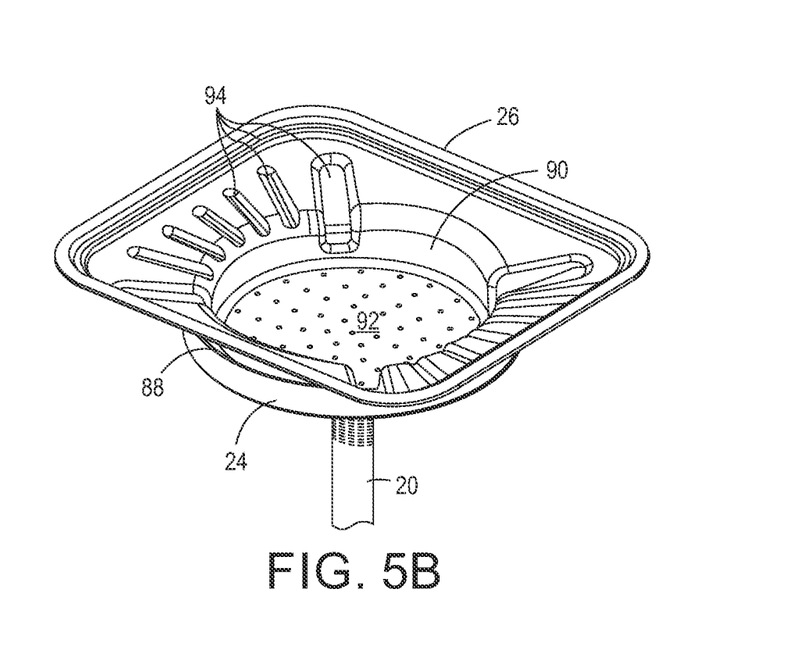
Figure 5C:
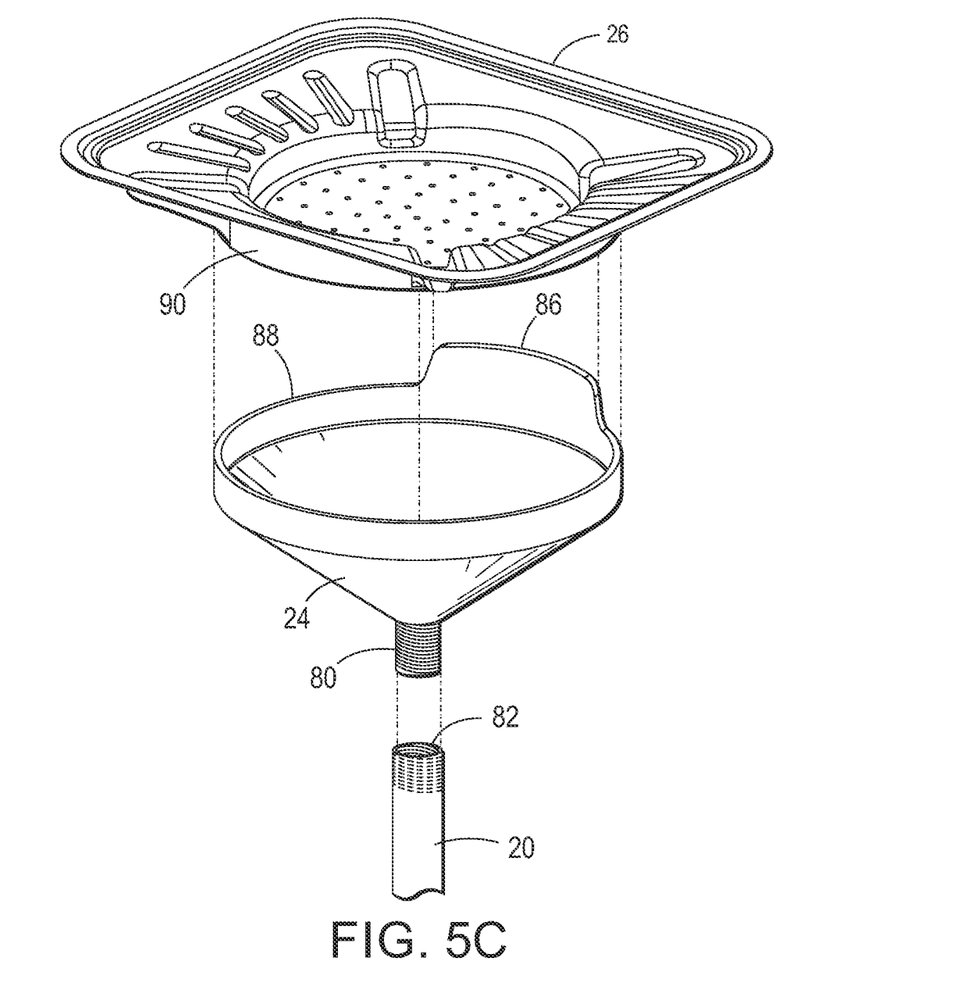
FIG. 5C is an exploded perspective depiction, of a funnel attached to an upper tube and a dripping pan insert for a fluid drain in accordance with an embodiment.

FIGS. 5A and 5B are perspective depictions, and FIG. 5C is an exploded perspective depiction, of the funnel 24 at the top of the upper tube 20 and dripping pan insert 26. In an embodiment, the funnel 24 may include a shaft 80 having exterior threads or rings that provide snagging contact with the interior diameter of an upper end 82 of the hollow upper tube 20 to secure the funnel 24 to the upper tube 20. The funnel 24 may include a screen (not individually depicted for simplicity) at the top of the shaft 80 such that the fluid drain 10 may be used without a dripping pan insert 26. In another embodiment, a replaceable dripping pan insert 26 may be placed into the funnel 24 as depicted in FIGS. 5A and 5B. The dripping pan insert 26 may be customized for the particular fluid that is being replaced. For example, a larger dripping pan insert 26 may be used to contain transmission fluid during removal of a transmission pan from a vehicle, with an outer perimeter of the dripping pan insert 26 being larger than an outer perimeter of the funnel 24. In an embodiment, a dripping pan insert 26 configured for transmission fluid may have a length of between about 37 inches and about 38 inches and a width of between about 24 inches and about 25 inches.

A smaller dripping pan insert 26 may used during replacement of engine oil through a drain plug, which may have a more precise directional flow of fluid than removal of a transmission pan. In an embodiment, a dripping pan insert 26 configured for engine oil may have a length of between about 25 inches and about 26 inches and a width of between about 22 inches and about 23 inches. In another embodiment, no dripping pan insert 26 is used, and the fluid is drained directly into the funnel 24.

The dripping pan insert 26 may be molded to include one or more recesses 84 that receive one or more raised lips 86 on the funnel 24 and thereby removably secures the dripping pan insert 26 to the funnel 24. The raised lips 86 may protrude, for example, between about 1.5 inches and about 1.75 inches from a lower lip 88 of the funnel 24. Additionally, the dripping pan insert 26 may include a lower body 90 that is molded to fit within the funnel 24 to further secure the dripping pan insert 26 to the funnel 24. The dripping pan insert 26 may further include a molded filter 92 to remove debris from fluid as it passes from the dripping pan insert 26 into the funnel 24. The dripping pan insert 26 may also include a plurality of molded ribs 94 that direct fluid to the center of the dripping pan insert 26 and provide structural rigidity to the insert 26.

Thus, an embodiment of a telescoping fluid drain may be provided that may include one or more structures that simplify the service and maintenance of vehicles. For example, a fluid reservoir for collecting fluid may include a flat tool shelf for storing tools, drain plugs, replacement parts such as gaskets and hoses, etc. during vehicle service. The top of the fluid reservoir may further include a filter shelf having one or more panels that slope toward a hole at the bottom of the filter shelf, where the hole extends from an exterior to an interior of the fluid reservoir.

A technician may remove an oil filter or other filter from a vehicle and place it hole-side down on the filter shelf, wherein the filter shelf allows fluid to drain from the filter and into the fluid reservoir. A lower tube may be adjusted into and out of the fluid reservoir to allow additional height adjustment of the fluid drain. A tool pan having one or more hooks for storing wrenches or other tools, a grip to assist in moving the fluid drain, and one or more shelves for storing tools, drain plugs, gaskets, etc., may be attached to the lower tube.

A height of the fluid drain may be adjusted using an upper tube clamp attached to the upper tube, for example a spring clip collar or a quick-release clamp. The upper tube clamp may remain attached to the upper tube during removal of the upper tube from the lower tube, for example during removal of fluid from the fluid reservoir, such that the height of the fluid drain does not require readjustment after reinsertion of the upper tube into the lower tube.

The fluid drain may also include a removable and replaceable dripping pan insert that may be customized for the job or task being performed. For example, a dripping pan insert with a large footprint may be used during replacement of transmission fluid and a dripping pan insert with a small footprint, or no insert, may be used during replacement of engine oil. The dripping pan insert may be removably secured in place within the funnel by a raised upper lip that protrudes from a lower lip of the funnel into a recess in the dripping pan insert.

In an embodiment, the lower tube 14 may have an outer diameter of between about 2 inches and about 2.5 inches and a length of between about 26 inches and about 28 inches. The upper tube 20 may have an outside diameter of between about 1.8 inches and about 1.9 inches, and a length of between about 23 inches and about 25 inches. The fluid drain may be adjustable from a minimum height of between about 50 inches and about 52 inches, to a maximum height of between about 72 inches and about 79 inches. Each of the fluid drain components described above may be manufactured from, for example, a polymer, a metal, a metal alloy, fiberglass, or a combination thereof using, for example, a stamping process, a molding process, an extrusion process, a spraying process, etc.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. It will be appreciated that structural components and/or processing stages can be added or existing structural components and/or processing stages can be removed or modified. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on"

used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

What is claimed is:

1. A fluid drain, comprising:
   a fluid reservoir comprising a lower tube inlet that opens into the fluid reservoir;
   a lower tube at least partially positioned within the lower tube inlet;
   an upper tube at least partially positioned within the lower tube;
   an upper tube clamp having an opening therein, wherein the upper tube is positioned within the opening in the upper tube clamp and the upper tube clamp is configured to remain attached to the upper tube upon removal of the upper tube from the lower tube; and
   a tool pan adjustably connected to the lower tube and including an opening through a center of the tool pan, wherein the lower tube is positioned within the opening through the center of the tool pan, a plurality of arms that extend radially from the center of the tool pan, an outer arcuate member connected to the plurality of arms, wherein the outer arcuate member terminates in a first end comprising a first hook and a second end comprising a second hook, at least one recessed shelf between two of the plurality of arms, and a grip defined by the outer arcuate member and an opening between two of the plurality of arms.

2. The fluid drain of claim 1, wherein the upper tube clamp is a spring clip collar configured to rest on an upper lip of the lower tube during use of the fluid drain, wherein a position of the spring clip collar on the upper tube sets a height of the fluid drain.

3. The fluid drain of claim 1, wherein the fluid reservoir further comprises a recessed filter shelf having a sloped floor that angles toward an opening within the sloped floor, and the opening within the sloped floor extends through an exterior of the fluid reservoir to an interior of the fluid reservoir.

4. The fluid drain of claim 3, wherein the sloped floor comprises a plurality of angled panels that angle downward toward the opening within the sloped floor.

5. The fluid drain of claim 1, further comprising a funnel connected to the upper tube and comprising a lower lip and an upper lip, wherein the upper lip protrudes between about 1.5 inches to about 1.8 inches from the lower lip.

6. The fluid drain of claim 5, further comprising a removable dripping pan insert, wherein the removable dripping pan insert comprises a recess configured to receive the upper lip of the funnel and to be removably secured within the funnel thereby.

7. The fluid drain of claim 1, wherein the upper tube clamp is an adjustable closed-loop clamp comprising a closed position and an open position, wherein the opening in the closed-loop clamp comprises a first diameter in the closed position and a second diameter in the open position, the second diameter is larger than the first diameter, the closed-loop clamp maintains a closed loop around an entirety of a circumference of the upper tube during adjustment of the adjustable closed-loop clamp, and the closed-loop clamp is configured to remain self-attached to the upper tube upon removal of the upper tube from the lower tube.

8. A fluid drain, comprising:
   a fluid reservoir comprising a lower tube inlet that opens into the fluid reservoir;
   a lower tube at least partially positioned within the lower tube inlet and secured to the fluid reservoir by a lower tube clamp;
   an upper tube at least partially positioned within the lower tube;
   an upper tube clamp having an opening therein, wherein the upper tube is positioned within the opening in the upper tube clamp and the upper tube clamp is configured to remain attached to the upper tube upon removal of the upper tube from the lower tube;
   a recessed filter shelf on a top of the fluid reservoir, the recessed filter shelf comprising a sloped floor and an opening within the sloped floor, wherein the sloped floor angles downward toward the opening within the sloped floor, wherein the opening within the sloped floor extends through an exterior of the fluid reservoir to an interior of the fluid reservoir;
   a tool pan adjustably connected to the lower tube, wherein the tool pan comprises:
      an opening through a center of the tool pan, wherein the lower tube is positioned within the opening through the center of the tool pan;
      a plurality of arms that extend radially from the center of the tool pan;
      an outer arcuate member connected to the plurality of arms, wherein the outer arcuate member terminates in a first end comprising a first hook and a second end comprising a second hook;
      at least one recessed shelf between two of the plurality of arms; and
      a grip defined by the outer arcuate member and an opening between two of the plurality of arms.

9. The fluid drain of claim 8, wherein the upper tube clamp is an adjustable closed-loop clamp comprising a closed position and an open position, wherein the opening in the closed-loop clamp comprises a first diameter in the closed position and a second diameter in the open position, the second diameter is larger than the first diameter, the closed-loop clamp maintains a closed loop around an entirety of a circumference of the upper tube during adjustment of the adjustable closed-loop clamp, and the closed-loop clamp is configured to remain self-attached to the upper tube upon removal of the upper tube from the lower tube.

10. The fluid drain of claim 9, wherein the upper tube clamp is a spring clip collar configured to rest on an upper lip of the lower tube during use of the fluid drain, wherein a position of the spring clip collar on the upper tube sets a height of the fluid drain.

11. The fluid drain of claim 9, wherein the sloped floor of the filter shelf comprises four angled panels that angle downward toward the opening within the sloped floor.

12. The fluid drain of claim 11, further comprising a funnel connected to the upper tube and comprising a lower lip and an upper lip, wherein the upper lip of the funnel protrudes between about 1.5 inches to about 1.8 inches from the lower lip of the funnel.

13. The fluid drain of claim 12, further comprising a removable dripping pan insert, wherein the removable dripping pan insert comprises a recess configured to receive the upper lip of the funnel and to be removably secured within the funnel thereby.

14. A fluid drain, comprising:
    a fluid reservoir comprising a lower tube inlet that opens into the fluid reservoir;
    a lower tube at least partially positioned within the lower tube inlet;
    an upper tube at least partially positioned within the lower tube; and
    a tool pan adjustably connected to the lower tube, wherein the tool pan comprises:
        an opening through a center of the tool pan, wherein the lower tube is positioned within the opening through the center of the tool pan;
        a plurality of arms that extend radially from the center of the tool pan;
        an outer arcuate member connected to the plurality of arms, wherein the outer arcuate member terminates in a first end comprising a first hook and a second end comprising a second hook;
        at least one recessed shelf between two of the plurality of arms; and
        a grip defined by the outer arcuate member and an opening between two of the plurality of arms.

\* \* \* \* \*